No. 757,371. Patented April 12, 1904.

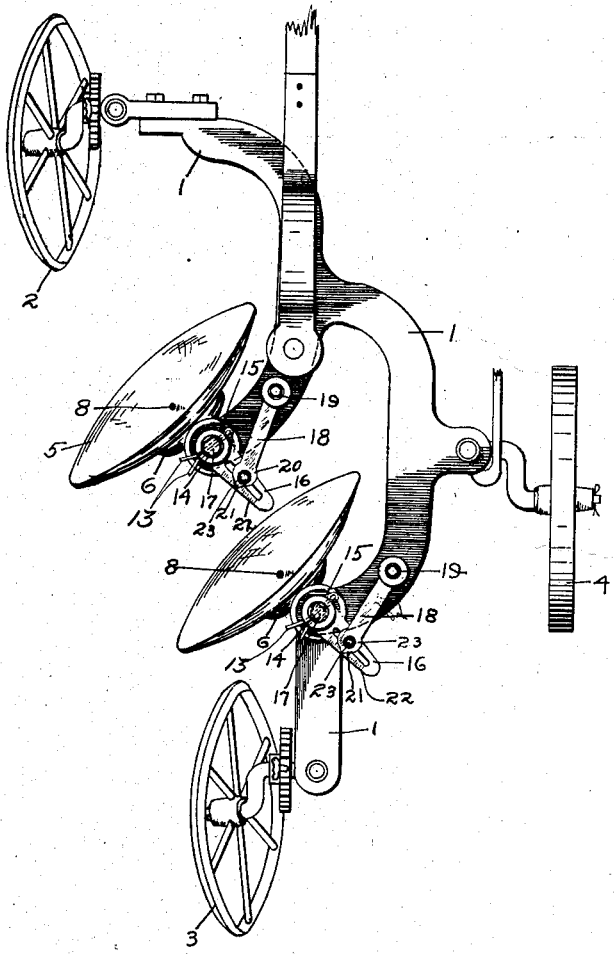

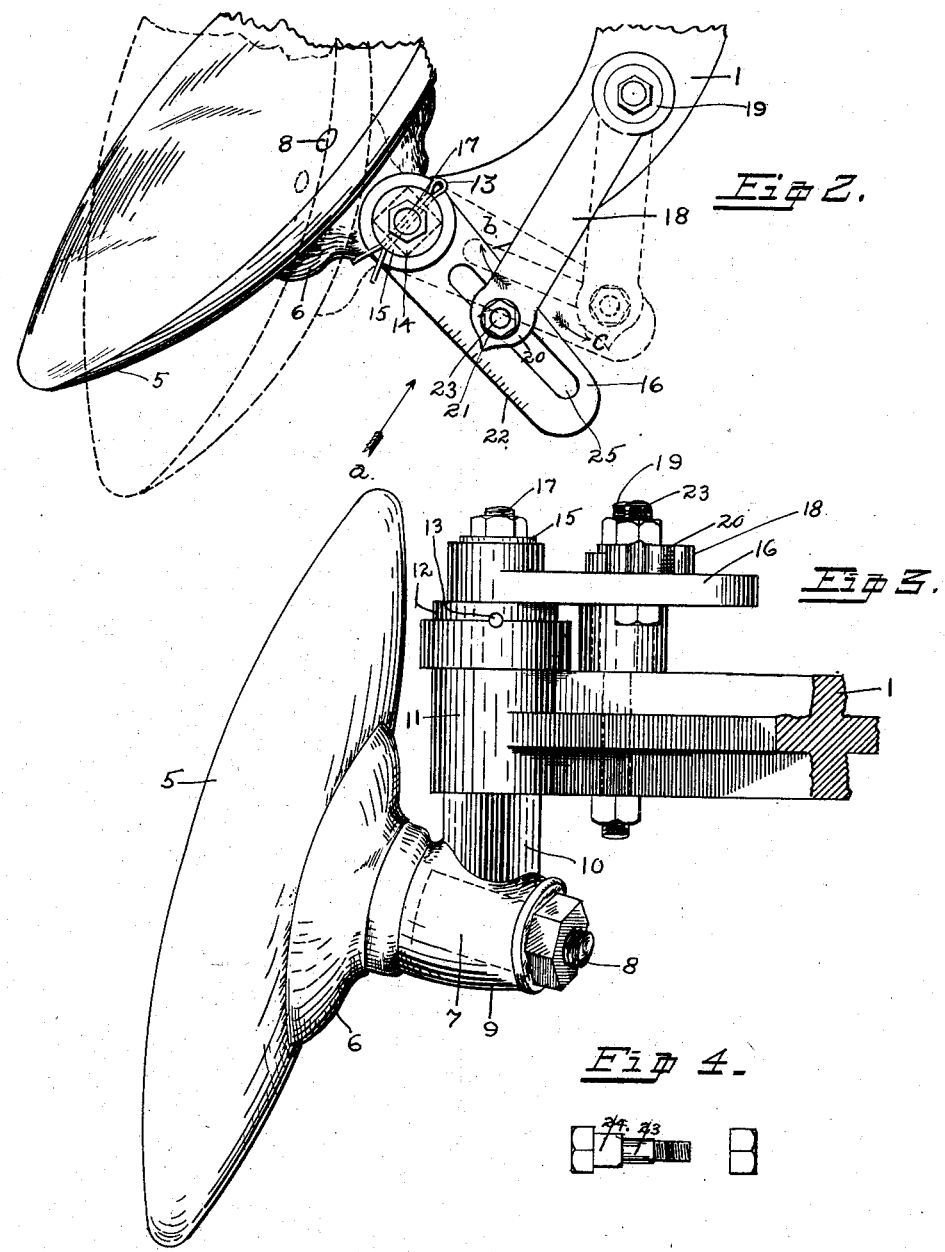

UNITED STATES PATENT OFFICE.

CHAPIN WAGNER, OF INDIANAPOLIS, INDIANA.

DISK PLOW.

SPECIFICATION forming part of Letters Patent No. 757,371, dated April 12, 1904.

Application filed October 22, 1902. Serial No. 128,214. (No model.)

*To all whom it may concern:*

Be it known that I, CHAPIN WAGNER, a citizen of the United States, residing at Indianapolis, in the county of Marion and State of Indiana, have invented new and useful Improvements in Disk Plows, of which the following is a specification.

My invention relates to certain new and useful improvements in disk plows; and it consists in a means whereby the plow-disk may be adjusted to cut various widths of furrows and whereby said disk will be firmly secured in such a manner as to insure it against a change of position due to extraneous forces, as rocky, hard, or other irregularities in the structure and composition of the earth, as will be hereinafter more fully described, and particularly pointed out in the claims.

The object of this invention is to provide a means for adjusting the plow-disks to cut wider or narrower widths of furrows, as required, and to construct such securing means to not only retain said plow-disk in its fixed and adjusted position, but also to provide such means that will be readily adjusted by any unskilled laborer into and to any new position and to provide means whereby the angularity of the plow-disk relatively to the line of direction of motion or draft may be readily ascertained. I attain these objects by means of the device illustrated in the accompanying drawings, in which similar numerals of reference designate like parts throughout the several views.

Figure 1 is a plan view of a disk plow and showing my invention of a plow-disk-adjusting means applied thereto. Fig. 2 is an enlarged detail broken plan view of a disk of the plow and showing the adjusting mechanism thereof. Fig. 3 is a similar enlarged detail elevational view of the same, and Fig. 4 is an enlarged detail view of the connecting-bolt for connecting the retaining-arm and the disk-retaining arm.

The plow-supporting frame 1 may be of any suitable form or construction and is provided with the forward furrow-wheel 2, the rearward furrow-wheel 3, and the land-wheel 4, and by means of said wheels said supporting-frame 1 is supported and adjusted as to height and position relatively to the ground to cause the plow-disk to cut shallower or deeper furrows, as required, and the manner of maintaining said supporting-wheels may be accomplished in any suitable manner or by any of the well-known ways peculiar to this type of plow and needs no special description.

The plow-disk 5 is dished or of concave form and is of the usual form of construction and has its convex side bolted to the concaved or enlarged cupped end 6 of the disk-supporting stem 7, (shown in dotted lines,) and the said disk 5 is securely bolted to said cupped end portion 6 by a securing-bolt 8, which passes centrally through said disk 5 and through the axis of the said stem 7. (See Fig. 3.) The stem 7 is journaled in the supporting-bearings 9, (see Fig. 3,) and the latter is provided with the vertically-extending pivotal stem 10, which is journaled in the bearing 11, formed integral on said supporting-frame 1, and said pivotal arm or stem 10 is secured in its said bearing 11 by means of the retaining-washer 12 and the split pin 13. The plow-disk-adjusting means, which is the main feature of my invention, I will now proceed to describe. The prolonged top portion 14 of said vertically-extending pivotal stem 10 is square in form, and the eye of the hub 15 of the lever-arm 16 is similarly formed and is adapted to accurately fit over said square 14, and said lever-arm 16 is secured thereon by a suitable bolt 17. (See particularly Figs. 2 and 3.) A retaining-arm 18 is pivotally connected at its pivotal end to a fixed pivotal pin 19, which latter has its lower reduced portion tightly fitted into a way or pin-fit formed in the main supporting-frame 1 in such a position thereon that the said retaining-arm 18 will be approximately at a right angle with the lever-arm 16. The free or outer indicating end 20 of said retaining-arm 18 is provided with an indicating-pointer or index 21, which points to the graduations 22, formed on the outer edge of the top side of the lever-arm 16, and the said end 20 is bored to receive the connecting-pin 23, which latter secures the said arm 18 to the arm 16. The pin 23 is formed with a square portion 24, which is adapted to fit into the slot 25, which latter extends longitudinally of the arm 16 and in which the said square portion 24 of said pin 23 is adapted to be moved from end to end of said slot 25, and thus when the free end 20 of the retaining-arm 18 is moved inwardly in the direction of the arrow $b$ to move the bolt 23 inwardly along the slot 25 and toward the pivotal stem 10 the disk 5 assumes a position as shown in full lines in Figs. 1 and 2, and when the said arm 18 is moved in the path of the arrow $c$ to move the bolt 23 toward the outer end of the said slot 25 the disk 5 will assume the position shown in Fig. 2 in dotted lines—that is, in position to cut or plow a narrower furrow in the earth.

It will be particularly observed that the resisting force exerted by the arm 18 is applied in a direction at approximately a right angle to the arm 16, and the forces thus applied will not tend to move said connecting-bolt 23 along in the slot 25 of the arm 16, but will rather tend to prevent its movement.

The object to be attained and accomplished by my invention will be readily seen and understood after an examination of the drawings and from the preceding description, and a further description of the mechanism and its operation is unnecessary.

Having thus fully described this my invention, what I claim as new and useful, and desire to cover by Letters Patent of the United States therefor, is—

1. In a disk plow, the combination with a plow-supporting frame and a plow-disk pivoted on said plow-frame, of a radially-extending arm fixed on the end of the pivotal center of said plow-disk and graduated, as described, a retaining-arm pivotally secured at a fixed point on said supporting-frame and adjustably connected at its opposite end to said radially-extending arm, and said retaining-arm having a fixed pivotal point so situated on said frame that said retaining-arm will be approximately at right angles with said radially-extending arm at all points when connected to the latter.

2. In a disk plow, the combination with a plow-supporting frame and a plow-disk pivoted on said plow-frame, of a radially-extending arm fixed on the pivotal center of said plow-disk and provided with a longitudinally-extending slot and said arm graduated, as described, and a retaining-arm pivotally secured at a fixed point on said supporting-frame and situated thereon so that said retaining-arm will be approximately at a right angle with said radially-extending arm when connected to the latter, and said retaining-arm provided with an indicating-finger whereby the angle at which the plow-disk is set indicated on said graduated scale on said radially-extending arm.

3. In a disk plow, the combination with the plow-supporting frame and a series of plow-disks pivoted on said plow-frame, of a series of radially-extending arms fixed on the pivotal centers of said plow-disks independently of each other and provided with longitudinally-extending slots, and said arms graduated, as described, and retaining-arms pivotally secured at fixed points on said supporting-frame and so situated thereon that each of said retaining-arms will be approximately at a right angle with its radially-extending arm, said retaining-arms each provided with an indicating-finger whereby the angles, at which each of said plow-disks to which said retaining-arms are connected, is set, are indicated on said graduated scales on said radially-extending arms.

In testimony whereof I have hereunto set my hand in the presence of two subscribing witnesses.

CHAPIN WAGNER.

Witnesses:
 THOMPSON R. BELL,
 CLARENCE E. CORBALEY.